(12) United States Patent
Lurey et al.

(10) Patent No.: US 8,656,504 B2
(45) Date of Patent: Feb. 18, 2014

(54) METHOD AND APPARATUS FOR PROTECTING ACCOUNT NUMBERS AND PASSWORDS

(75) Inventors: Craig B. Lurey, El Dorado Hills, CA (US); Darren S. Guccione, Chicago, IL (US)

(73) Assignee: Keeper Security, Inc., Chicago, IL (US)

( * ) Notice: Subject to any disclaimer, the term of this patent is extended or adjusted under 35 U.S.C. 154(b) by 485 days.

(21) Appl. No.: 12/546,881

(22) Filed: Aug. 25, 2009

(65) Prior Publication Data

US 2011/0055931 A1 Mar. 3, 2011

(51) Int. Cl.
*G06F 21/00* (2013.01)
(52) U.S. Cl.
USPC .................. 726/27; 726/17; 726/26; 713/165
(58) Field of Classification Search
USPC ...................................... 726/27, 30; 713/183
See application file for complete search history.

(56) References Cited

U.S. PATENT DOCUMENTS

| | | | |
|---|---|---|---|
| 6,732,278 B2 * | 5/2004 | Baird et al. ..................... 726/7 |
| 7,644,860 B2 * | 1/2010 | Matsushita et al. ........... 235/382 |
| 7,945,586 B1 * | 5/2011 | Fang et al. ..................... 707/785 |
| 2002/0051540 A1 * | 5/2002 | Glick et al. .................... 380/258 |
| 2002/0055909 A1 * | 5/2002 | Fung et al. ..................... 705/42 |
| 2003/0130957 A1 * | 7/2003 | Best et al. ..................... 705/72 |
| 2004/0117651 A1 * | 6/2004 | Little et al. .................... 713/200 |
| 2005/0251491 A1 * | 11/2005 | Medina et al. ................. 705/71 |
| 2005/0257057 A1 | 11/2005 | Ivanov et al. |
| 2007/0061266 A1 | 3/2007 | Moore et al. |
| 2008/0060052 A1 * | 3/2008 | Hwang et al. .................. 726/2 |
| 2008/0142599 A1 * | 6/2008 | Benillouche et al. ..... 235/462.41 |
| 2009/0046858 A1 * | 2/2009 | Iyer et al. ..................... 380/259 |

OTHER PUBLICATIONS

Ascendo et al. "Ascendo DataVault—BlackBerry Passwprd Manager Version 4 user guide" Oct. 2007, http://web.archive.org/web/20071020175341/http://ascendo-inc.com/UserGuides/DV/DV4UGContents.html.*
Ascendo et al. "Ascendo DataVault—BlackBerry Passwprd Manager Version 4 user guide" Oct. 2007, http://web, arch ive.org/web/20071020175341/http://ascendo-inc.com/UserGuides/DV/DV4UGContents.html.*
Search Report and Written Opinion for International Application No. PCT/US2010/046715 mailed Oct. 14, 2010, 13 pages.

* cited by examiner

*Primary Examiner* — Jung Kim
*Assistant Examiner* — Carlos M De Jesus, Jr.
(74) *Attorney, Agent, or Firm* — Blanchard & Associates

(57) ABSTRACT

A method and apparatus are provided for protecting confidential information. The method includes the steps of providing a plurality of files where each file contains at least one item of secret information, password protecting the plurality of files with a master password, detecting entry of passwords into a master password entry field, comparing entered passwords with the master password to identify incorrect master passwords and deleting the plurality of files upon successive entry of incorrect master passwords a predetermined number of times.

18 Claims, 6 Drawing Sheets

METHOD AND APPARATUS FOR PROTECTING ACCOUNT NUMBERS AND PASSWORDS

FIELD OF THE INVENTION

The field of the invention relates to portable electronic devices and more particularly to the security of information kept within portable devices.

BACKGROUND OF THE INVENTION

Fraud prevention methods are well known. In the past, methods of fraud prevention were based upon a personal relationship among transaction partners. Merchants knew their customers and would not be fooled by someone else asking for access to customer accounts.

In today's environment, merchants and account managers do not personally know their customers. As such, access to accounts is typically based upon at least two levels of security. On the first level, a user is required to have some form of identification (e.g., a credit or debit card, an account number, etc.). The second level of security is usually a password.

The first level of security is often manifested in a hard-coded format (e.g., a plastic card) that could be lost or stolen. On the other hand, the second level of security (i.e., passwords) are often committed to memory. As long as a person's password is committed to memory, a lost or stolen credit card is useless.

However, many people often forget their passwords. As a consequence, some people will write their passwords down and carry the passwords with them in their purse or wallet. In this case, if the user loses their purse or wallet, then a thief may still be able to access the accounts of the account holder.

In order to counteract the problem of compromised passwords, many organizations will often request personal information from users (e.g., mother's maiden name, high school mascot, name of first employer, etc.). In addition, to requiring an account number and passwords, many organizations often request an item of personal information on a random basis.

While adding another level of security further increases security, the additional level further increases the difficulty in providing the information of the various levels of security, especially where the memory of a user is impaired. This problem is made worse when a user has accounts with many different organizations. Accordingly, a need exists for better methods of providing the information required for the various levels of security.

SUMMARY OF THE INVENTION

A method and apparatus are provided for protecting confidential information. The method includes the steps of providing a plurality of files where each file contains at least one item of secret information, password protecting the plurality of files with a master password, detecting entry of passwords into a master password entry field, comparing entered passwords with the master password to identify incorrect master passwords and deleting the plurality of files upon successive entry of incorrect master passwords a predetermined number of times.

DETAILED DESCRIPTION OF AN ILLUSTRATED EMBODIMENT

Figure 1:
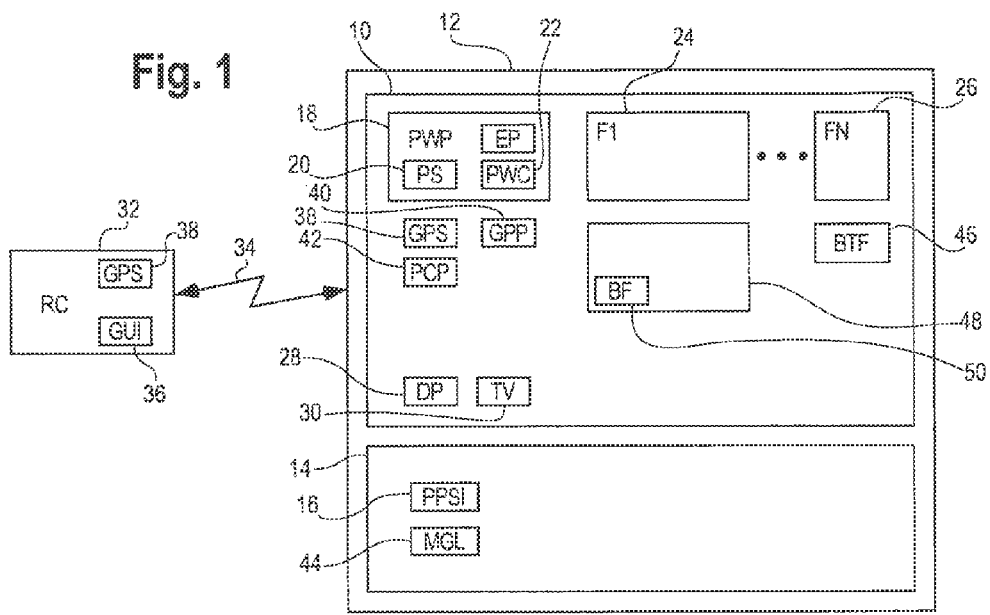
FIG. 1 is a block diagram of a password protection system 10 shown in a context of use generally in accordance with an illustrated embodiment of the invention.

FIG. 1 is a block diagram of a password protection system 10 shown within a context of use generally in accordance with an illustrated embodiment of the invention. The password protection system 10 may be used in conjunction with any of a number of portable electronic devices (e.g., an iPhone, PDA, portable computer, desktop computer etc.) 12 for convenient access to personal information in a safe, secure, portable environment.

Under the illustrated embodiment, a separate subject matter file may be created within the password protection system 10 for each unit of confidential information. For example, a first file may be provided for a VISA credit card, a second file may be provided for a MASTERCARD, a third file may be provided for bank or brokerage accounts, etc. Moreover, each file is not limited in the amount of information that may be used to define the unit of information.

Each file within the password protection system may be identified by a convenient title. In most cases, the title may be selected to be suggestive of the subject matter of the file. For example, a VISA file may be entitled "VISA."

Another file may be entitled "mortgages" as an indication of content. Within the file may be a name and account number of a mortgage holder. Alternatively, the content of the file may be a list of mortgage holders where a content of the list operate as pointers to other files that contain the specific account information of the mortgage holders in the list.

Moreover, the information contained within the password protection system 10 is intended to be automatically deleted upon the occurrence of any of a number of predetermined events. For example, entry of a sequence of incorrect passwords into the field intended for entry of a master password may cause deletion of all of the data within the password protection system 10 when the number of incorrect passwords in the sequence exceeds some predetermined value. Similarly, any attempt to copy the password protection system 10 or the encrypted files of the password protection system 10 may also automatically cause deletion.

Under another illustrated embodiment, the password protection system 10 may automatically offer information based upon geographic location. In this case, a user of the device 12 may mark certain geographic locations where certain units of confidential information are typically used. The next time that the user logs into the password protection system 10 at the marked location, the password protection system 10 automatically offers access to the marked information that corresponds to that geographic location.

The password protection system 10 may be used as an auxiliary application on any of a number of electronic devices 12 or as a single application on a stand-alone portable electronic device. For example, the password protection system 10 could be used as an application on an iPhone.

While the password protection system may have its greatest utility in small portable devices, the password protection system 10 may also be used in laptops and other desktop computer devices. For simplicity, the system 10 will first be described in the context of a laptop or desktop computer 12.

Figure 2:
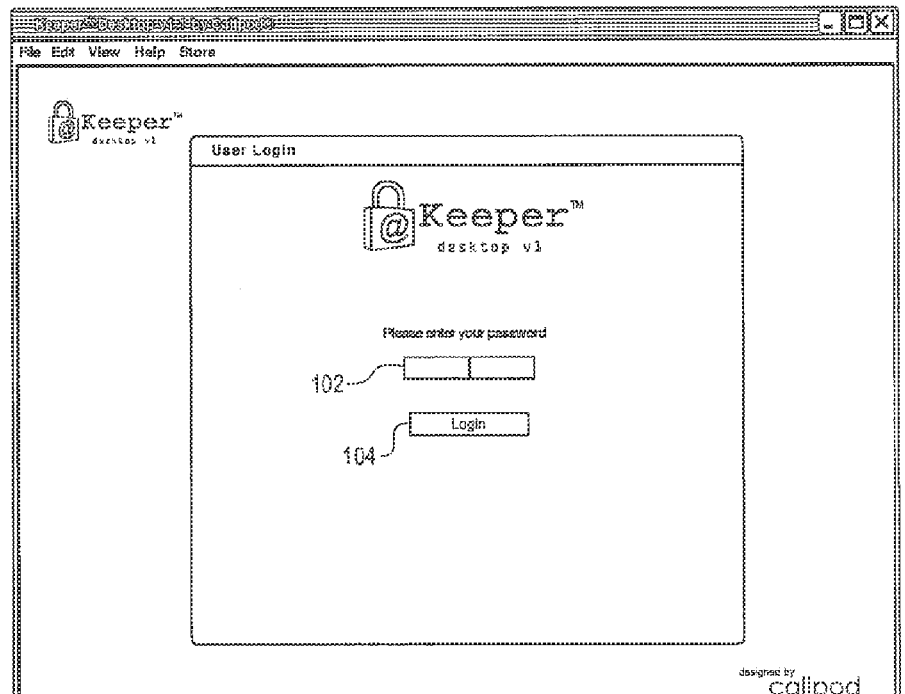
FIG. 2 is a master password entry screen that may be used by the system of FIG. 1.

In order to access the system 10, an access icon 16 of the password protection system 10 may be provided on a display 14 of the device 12. Upon selection of the icon 16, a sign on or login screen 100 (FIG. 2) may be presented to the user. Included within the sign on screen may be an interactive window 102 for entry of a master password. As used herein, a master password is an alphanumeric string used for gaining global access to the password protection system 10.

The master password may be any length up to 32 characters or longer in some cases. Any combination of letters or numbers may be combined depending upon the level of security needed.

Once presented with the interactive window for the master password, a user may enter the master password and activate an ENTER or LOGIN softkey 104. In response, a password processor 18 may compare the entered password with a previously saved master password 20.

If the password entered through the master password window 102 matches the saved master password 20, then access is granted to the subject matter files 24, 26 of the password protection system 10. For example, the window 200 of FIG. 3 may be presented to the user showing a list of titles 202.

On the other hand, if the entered password does not match the saved master password 20, then the password processor 18 increments a master password sequence counter or count register 22. Each time the entered password matches the saved master password 20, the password processor 18 resets (i.e., enters a zero value into) the master password sequence count register 22.

After each incorrect master password, the password processor 18 compares the value within the sequence count register 22 with a threshold value (e.g., a value of 5) 30. If the value within the count register 22 exceeds the threshold value 30, then the password processor 18 may activate a deletion processor 28. The deletion processor automatically and completely deletes each of the subject matter files 24, 26.

It should be specifically noted that the password protection system 10 does not provide any method for recovering or resetting forgotten master passwords. Moreover, if an unauthorized party should attempt to guess a password or use some computer controlled algorithm to match the master password, the automatic deletion of the subject matter files will defeat such attempt after a very limited number of tries.

Information saved within the system 10 may be encrypted using a public key and military specified encryption algorithm. In this regard, the public key and encryption algorithm operate on substantially all of the data within the system 10. On a first level, the master password is encrypted using the public key and encryption algorithm. Passwords entered through the password window 102 are encrypted and compared with the previously encrypted master password 20 during login. On another level, the subject matter files 24, 26 are further encrypted using the encrypted master password 20.

Once a user opens the password protection system 10, the password processor decrypts the files 24, 26 and the user is presented with a navigation screen 200 containing the list of titles (alphanumeric sequences) 202 where each title corresponds to a respective file 24, 26. Each title of the list 202 presented on the navigation screen 200 operates as an access softkey for accessing a corresponding respective file 24, 26.

As opposed to scrolling through the list 202, the user may also search the files 24, 26. Included on the navigation screen may be an interactive window 204 for entering a search term. In this regard, the name and content of the files 24, 26 may be searchable. For example, if a user wishes to know if he/she has used the same term (e.g., title, password, etc.) for any other file, the user may enter the term, activate the ENTER button and the password system 10 will return an indication of any other files in which the term has been used.

Alternatively, the user may be provided with a "sort by" menu softkey 206. In this case, if the user selects "Sort by Title" and enters a letter, then the system 10 will return an alphabetic list of files 24, 26 that have a title beginning with the entered letter. Alternatively, the user may sort by oldest or youngest file 24, 26.

Associated with each of the files 24, 26 may be a number of information fields 208, 210, 212, 214 defined according to function. If the user wishes to retrieve a particular file 24, 26, then the user may select the corresponding title (e.g., title 302 in FIG. 4) from the list 202. Upon selection of the title 302, the user is presented with the information within each of the fields 208, 210, 212, 214.

Figure 4:
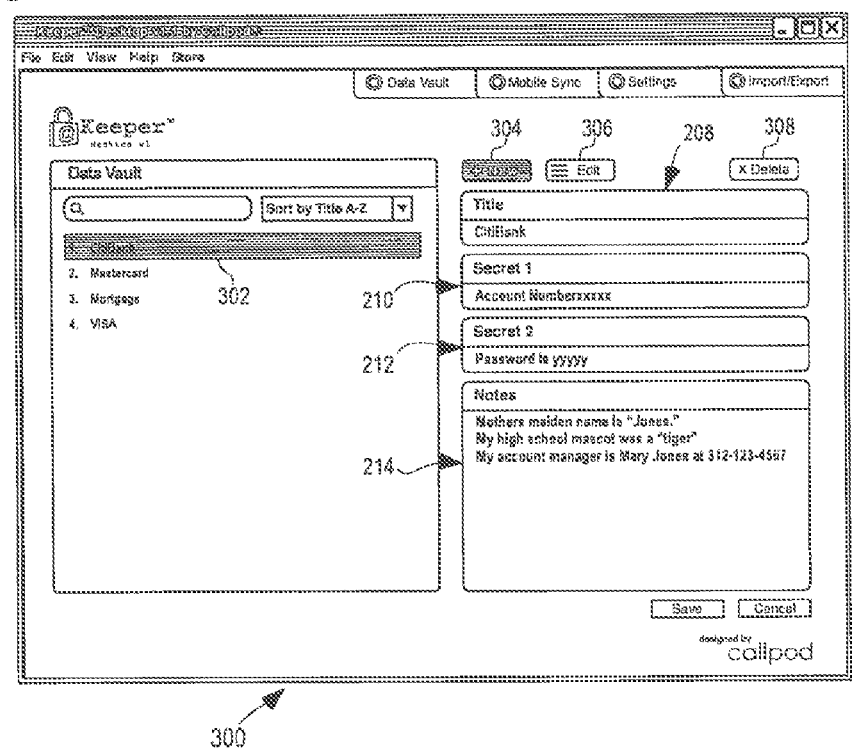
FIG. 4 is confidential information for a title selected by a user from the screen of FIG. 3.

In the example shown in FIG. 4, the user has selected the title "CitiBank" 302. In this case, the file 24, 26 contains information regarding a bank account with CitiBank. The title "CitiBank" is shown in the first field 208, the account number "xxxxx" is shown in the second field 210 as the first secret item, the password "yyyyy" is shown as the second secret item in the third field 212.

Also shown in FIG. 4 is a fourth field 214 labeled "Notes." Within the Notes field 214, the user may enter any information used in conjunction with the account. In this case, the user may enter the answers to the personal questions asked by the bank in setting up the account. In this case, the answers to the personal questions may be used by the bank to confirm the identity of the user in any of a variety of different situations (e.g., on-line transactions, telephone requests, etc.).

In addition to retrieving information, the user can also easily modify the records 24, 26 within the system 10. For example, if the user should want to change a password saved in the second field or window 212 of the screen 300, then the user may activate an Edit softkey 306. Once the Edit softkey 306 has been activated, the user can place a cursor over the information of the fields 208, 210, 212, 214 and enter changes.

Similarly, if the user should wish to create an entry for a new account (i.e., create a new file 24, 26), the user may activate the New softkey 304. Once the New softkey 304 is activated, the user can add files 24, 26 as necessary by typing a title into the first window 208 followed by additional information into the following windows 210, 212, 214.

If the user should find that certain information has become outdated or may be replaced by other information, the user can delete the appropriate files 24, 26. In this case, the user simply selects the title of a file 24, 26 and activates the Delete softkey 308.

Figure 3:
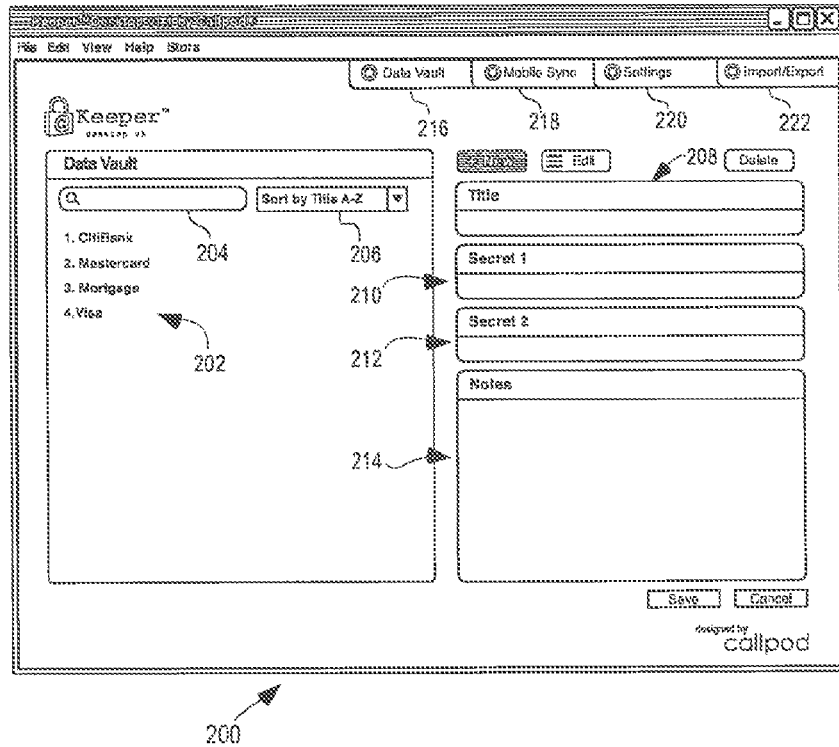
FIG. 3 is a title selection list screen of confidential information that may be displayed by the system of FIG. 1.

Similarly, the system 10 can be adapted to any of a number of different uses. For example, if the user should wish to change the user interface of the system 10, then the user may activate the Settings softkey 220 (FIG. 3).

Figure 5:
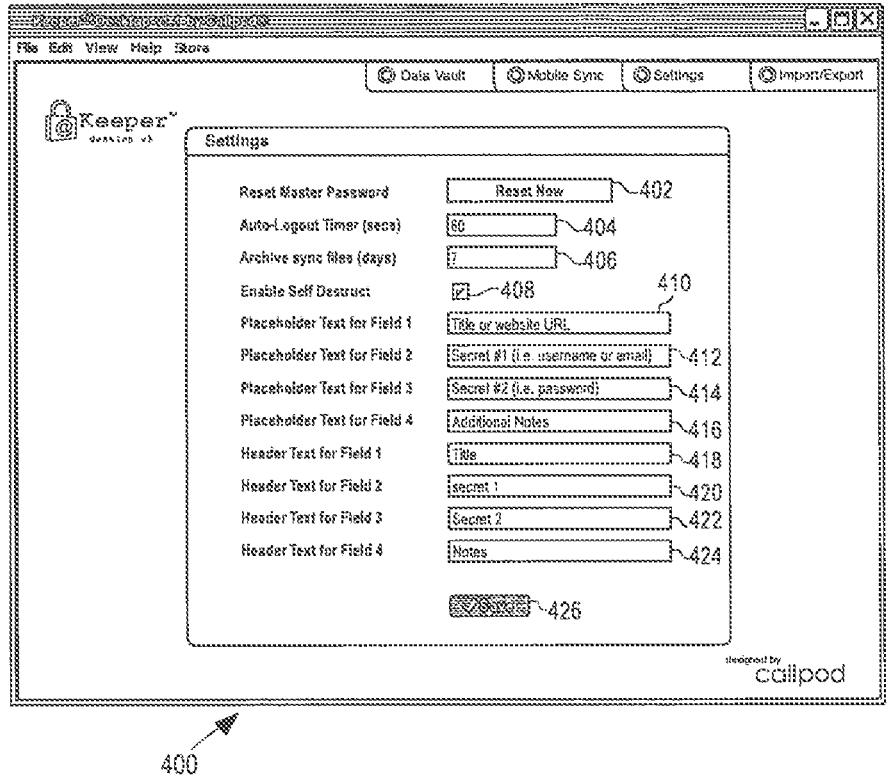
FIG. 5 is a settings screen that may be selected be a user through the screens of FIG. 3 or 4.

Upon activating the Settings softkey 220, the user is presented with the settings screen 400 of FIG. 5. A first choice of the settings screen 400 is a Reset Master Password softkey 402. The Reset softkey 402 resets the master password 20.

In order to reset the master password 20, the password processor 18 first decrypts each of the files 24, 26 using the old encrypted master password 20. The password processor 18 then requires that the user enter a new master password a first and then a second time. If the two newly entered passwords match then the password processor first encrypts the new master password 20 and then re-encrypts each of the files 24, 26.

Another choice on the setting screen 400 is a window 404 for entering a time delay controlling automatic logout. In this case, a timer within the system 10 is initiated each time the user logs in. When the timer reaches the time value shown in the window 404 (or reaches zero from a starting value equal to the time shown in the window 404), the system 10 automatically logs the user out of the system 10. The logout in this case may be set to a relatively short period of time to further protect the files 24, 26 by automatically requiring the user to re-enter the master password each time the time period 404 elapses.

Another choice on the settings screen 400 is a window 406 for specifying a time interval for backing up or otherwise archiving the files 24, 26 in a memory device. In this case, the specified time is in days. After the expiration of the time period specified in the window 406, the user is prompted to synchronize the files 24, 26.

Another choice on the settings screen 400 is a box 408 for enabling or disabling the automatic deletion of the files 24, 26. If the box 408 is checked, then after a specified sequence of incorrect master passwords are entered, the files 24, 26 are automatically deleted. If the box 408 is not checked, then the system 10 will not delete the files 24, 26. However, the system 10 will continue to deny access until the proper master password is entered.

Other choices include a number of windows 410, 412, 414, 416, 418, 420, 422, 424 that may be used in conjunction with the New softkey 304 and with the creation of new files 24, 26. For example, boxes 418, 420, 422, 424 are used for entering the terms that will appear in the upper halves of fields 208, 210, 212, 214. Boxes 410, 412, 414, 416 are used for entry of placeholder terms that are initially displayed in the lower halves of fields 208, 210, 212, 214 and that are replaced with the actual information entered by the user. For example, a first box 418 may be used for entry of header text (e.g., the word "title") or other descriptive term in the upper portion of field 208 for each of the files 24, 26. In the example, of FIG. 5, the placeholder for the header text entered through box 410 is descriptive of the format of the header text, including an identifier of a bank or credit account or the name of a website.

Similarly, a second box 420 and third box 422 may be used for entry of descriptive header text displayed in the top halves of the second and third fields 210, 212, respectively, while boxes 412, 414 receive descriptive placeholder information of the format of user information that may be entered into the lower halves of the second and third fields 210, 212. For example, box 420 may have the title of "secret 1" in the top half of field 210 while the placeholder entered through box 412 may be "Secret #1 (i.e., username or email)." Similarly, box 422 may have the title of "secret 2" in the top half of field 212 while the placeholder entered through box 414 may be "Secret #2 (i.e., password)." Box 424 may have the header text of "Notes" in the top half of field 214 while the placeholder entered through box 416 may be "Additional Notes." The user may make whatever setting changes desired and activate a Save softkey 426 to save the desired settings.

Figure 6:
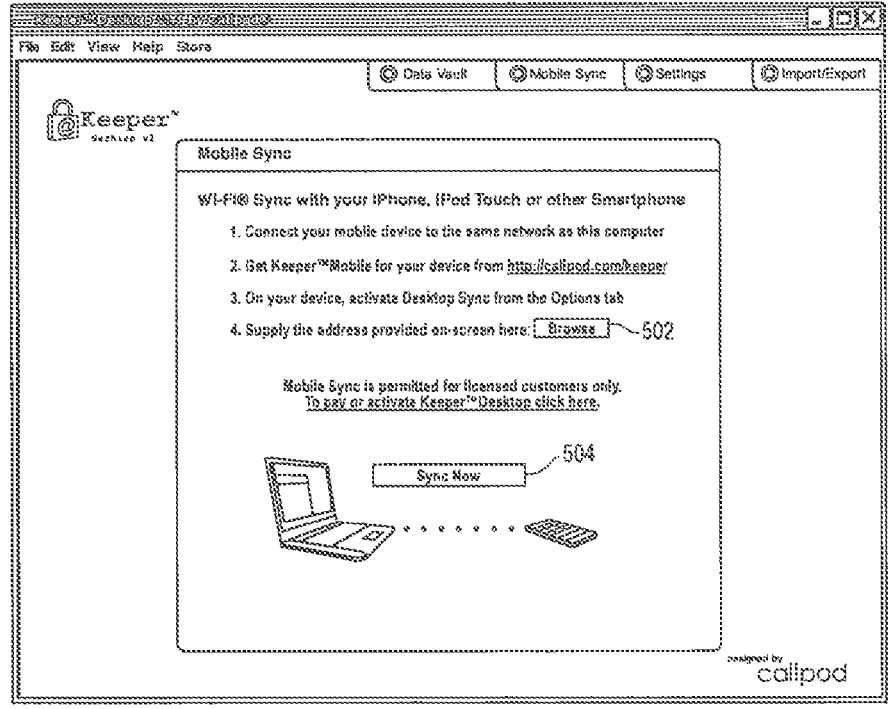
FIG. 6 is a synchronization screen that may be selected by a user through the screens of FIGS. 3-5.

If the user should select the Mobile Sync softkey 218 (FIG. 3), then the user may be presented with the screen 500 of FIG. 6. The Mobile Sync softkey 218 operates to synchronize data or otherwise exchange updates between the laptop 12 and mobile device 32.

In order to synchronize data, the user first provides an appropriate software version of the system 10 to the mobile device 32 and connects the mobile device 32 to the same network as the laptop 12. In this regard, the connection may be established via any appropriate medium (e.g., WiFi, USB cable, Bluetooth, etc.). In the example of FIG. 1, the laptop 12 is connected to the mobile device 32 via a WiFi connection 34.

To initiate synchronization, the user activates Mobile Sync softkey 218 (if not already activated). From the screen 500, the user may select the communication system via a Browse softkey 502. In the example of FIG. 1, the user would select the WiFi connection 32. Once the communication connection 34 has been selected, the user activates the Sync Now softkey 504 to synchronize files 24, 26 among devices 12, 32.

Figure 7:
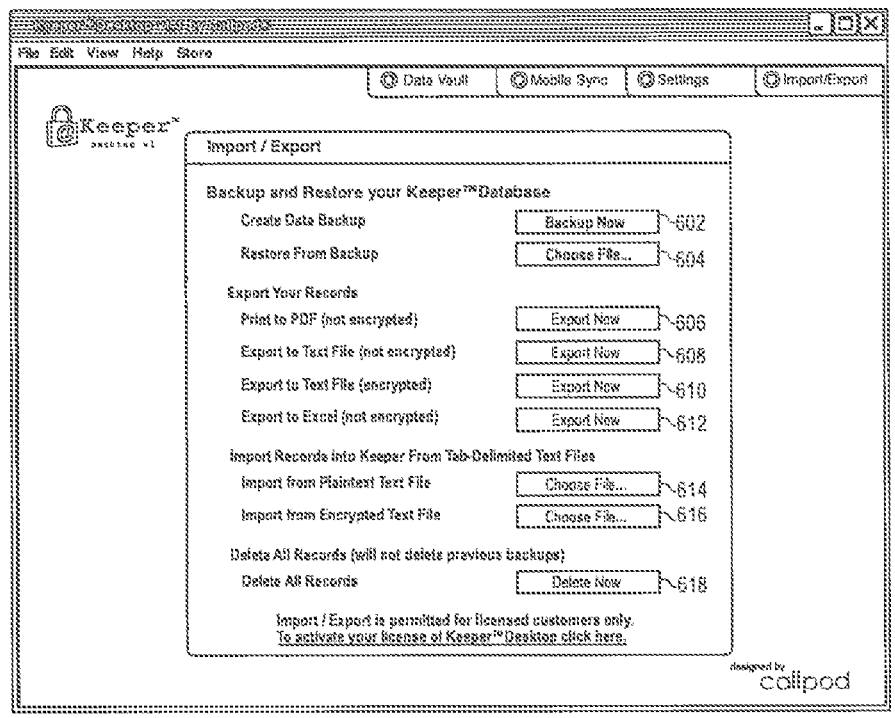
FIG. 7 is a Import/Export screen that may be selected by a user through the screens of FIGS. 3-6.

In addition to synchronizing files 24, 26, the user may also archive the files 24, 26. In this case, the user may activate an Import/Export softkey 222 (FIG. 3). In response, the screen of FIG. 7 may be presented to the user.

If the user has not previously backed up the files, then the user may activate the Backup Now softkey 602. In response, the user would be presented with a proposed path/file name for backup. The user may either activate an OK softkey or modify the proposed path/file name and then activate the OK softkey to complete the backup.

Alternatively, the user may restore a previous set of files 24, 26 by activating a Chose File softkey 604. In response, the user may be presented with one or more previously created backup file. The user may select one of the files followed by activation of an OK softkey completing the restore operation.

The user may also export the files 24, 26 either in an encrypted on unencrypted format. For example, a user may export the files 24, 26 under an unencrypted pdf format by activating an Export Now softkey 606. In response, the user would be presented with an interactive window for entry of a path/filename. The user may select a path, enter a file name and activate an OK softkey to complete exportation into the unencrypted pdf file.

Similarly, the user may export the files 24, 26 under an unencrypted text format by activating an Export Now softkey 608. In response, the user would be presented with an interactive window for entry of a path/filename. The user may select a path, enter a file name and activate an OK softkey to complete exportation into the unencrypted text file.

Alternatively, the user may export the files 24, 26 under an encrypted text format by activating an Export Now softkey 610. In response, the user would be presented with an interactive window for entry of a path/filename. The user may select a path, enter a file name and activate an OK softkey to complete exportation into the encrypted text file.

In another alternative, the user may export the files 24, 26 under an unencrypted Excel format by activating an Export Now softkey 612. In response, the user would be presented with an interactive window for entry of a path/filename. The user may select a path, enter a file name and activate an OK softkey to complete exportation into the unencrypted Excel file.

The user may also import files from one or more tab-delimited text files having the appropriate format. In this case, the user may import from a plaintext text file by activating a Choose File softkey 614. In response, the user would be presented with a Browse softkey where the user would select the appropriate text file. The user may then activate an OK softkey to complete the importation.

The user may also import files from one or more text files having the appropriate encrypted format. In this case, the user may import from an encrypted plaintext text file by activating a Choose File softkey 616. In response, the user would be presented with a Browse softkey where the user would select the appropriate encrypted text file. The user may then activate an OK softkey to complete the importation.

The user may also delete all files 24, 26 within the system 10 by activating the Delete Now softkey 618. Activation of this softkey 618 will not affect previous backups of the files 24, 26.

Under another illustrated embodiment, the system 10 includes (or accesses) a global positioning system (GPS) sensor 38. Each time that the user opens a particular file 24, 26, the GPS sensor 38 may determine a current global position (e.g., by street address, latitude and longitude, etc.) of the device 12, 32 and a global positioning processor 40 saves the global position within the file 24, 26. If the file 24, 26 already contains a record of the current global position, then the global positioning processor may increment the number of times that the file 24, 26 has been opened at the current position. Alternatively, a user may activate a Mark Global Position softkey 44 to mark a particular location of use of the file 24, 26.

The collection of geographic information may be very useful in some situations. For example, where a user enters a bank or stock broker's office, it is very likely that the user will need access to any files 24, 26 containing secret information related to one or more accounts the user has previously established with the bank or broker.

Operating in the background on the system 10 may be a position comparison processor 42 that determines a current global position of the system 10 each time that the user logs into the system 10 or periodically after login. A comparator within the position comparison processor 42 then looks for any marked files 24, 26 or compares the current global position with any global positions saved within each of the files 24, 26 to identify any files 24, 26 that are frequently used at the current geographic location. The position comparison processor 42 may do this by comparing the number of times that a file was opened at a current location with a threshold value used to eliminate random events. The position comparison processor 42 may then order any remaining files based upon which file 24, 26 was opened most frequently at the current location and proceed to present the ordered list to the user. The user may open the most frequently used file 24, 26, scroll through the list or open none at all.

In general, the system 10 operates substantially the same on the mobile unit 32 as on the laptop or desktop device 12. One exception is the graphical user interface (GUI) 14. For example, where the system 10 is installed into an iPhone, the GUI 36 of the mobile unit 32 would appear somewhat different than when used on the laptop 12.

Figure 8:
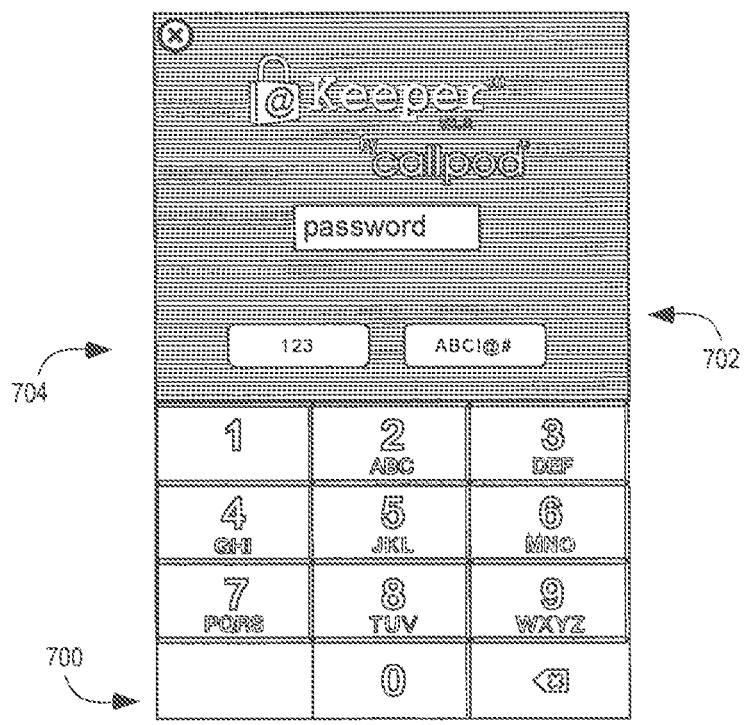
FIG. 8 is a master password entry screen of a portable device that may be used by the system of FIG. 1.

For example, to access the system 10, the user would activate the password protection system icon 16 on the mobile device 32. In response, the login screen 700 of FIG. 8 would appear on the GUI 36 of the mobile device 32.

Using the screen 700, the user would log into the system 10. For a master password including numbers, the user would activate the number softkey 704 for entering numbers. For letters, the user would activate the alphabetic softkey 702 and be presented with a full alphabetic keyboard instead of the number keyboard shown on screen 700.

Figure 9:
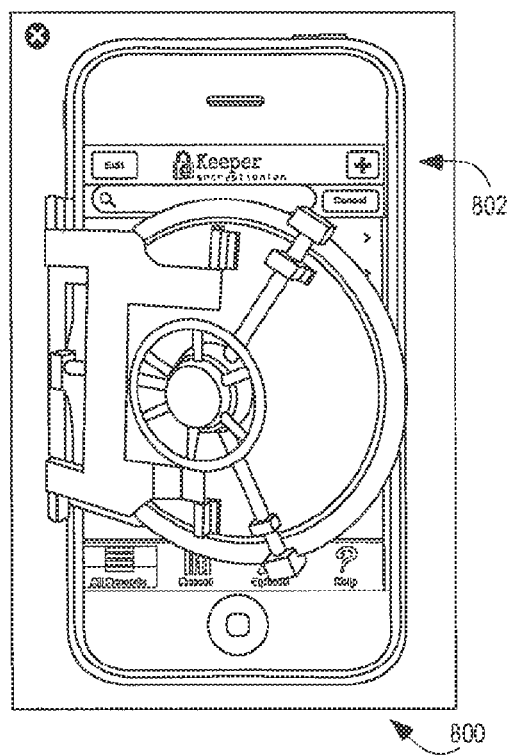
FIG. 9 is a introductory title list screen of a portable device that may be used with the system of FIG. 1.

Upon the successful entry of a master password, the screen 800 of FIG. 9 would appear on the mobile device 32. In order to access the records 24, 26, the user may activate an advance softkey 802.

Figure 10:
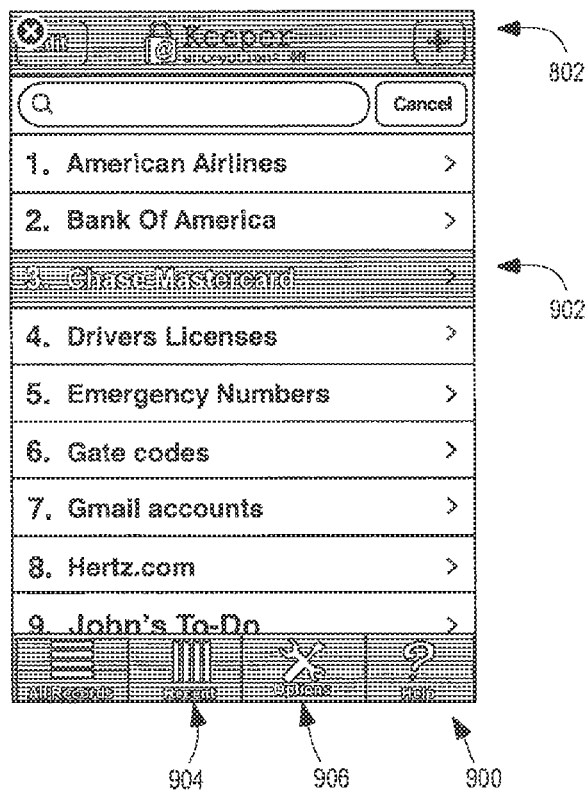
FIG. 10 is a selection list screen of confidential information of a portable device that may be displayed by the system of FIG. 1.

Upon activating the advance softkey 802, the user may be presented with the screen 900 of FIG. 10 showing a list of titles 202. If the user does not see the title that he/she wants, then the user may continue to activate the advance softkey 802. Alternatively, the user may activate a most recently accessed softkey 904 to view a set of most recently displayed records 24, 26.

Figure 11:
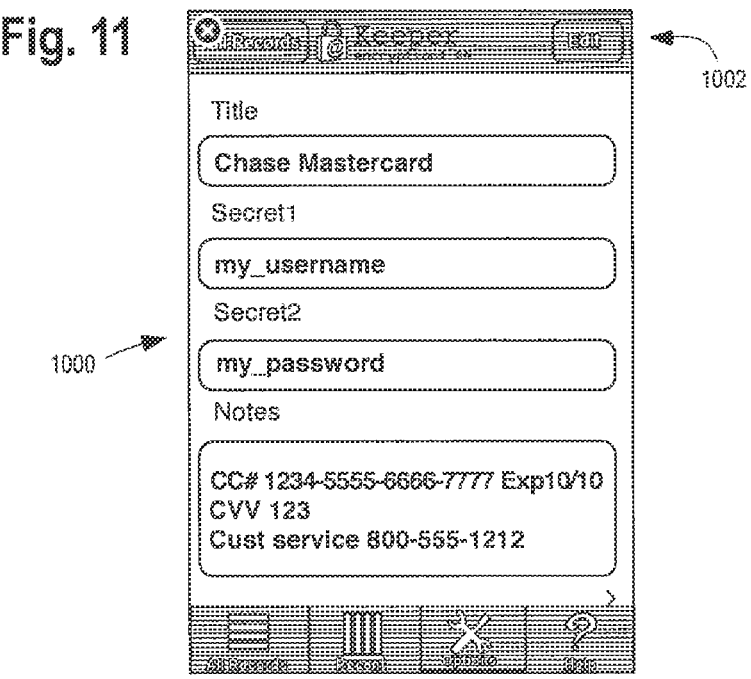
FIG. 11 is an information screen of a portable device that may be selected through the screen of FIG. 10.

Alternatively, the user may select one of the titles (e.g., title 902 of FIG. 10). Upon activating the title 902, the user would be taken to the screen 1000 of FIG. 11.

The user may review and use the information on the screen 1000 or may decide that the information needs to be updated. If the user desires to update the screen 1000, then the user activates the Edit softkey 1002 and is taken to the screen 1100 of FIG. 12.

Figure 12:
FIG. 12 is an edit screen that may be selected through the screen of FIG. 11.

On the screen 1100 of FIG. 12, the user may place a cursor 1102 where ever desired and make corrections. Once the corrections are complete, the user may activate the Save softkey 1104. Alternatively, the user may activate the Cancel softkey 1106 or Close softkey 1108 to cancel the corrections. If the user activates the Close softkey 1108, then the system 10 would close and the user would be required to activate the system icon 16 to login and continue use of the system 10.

Figure 13:
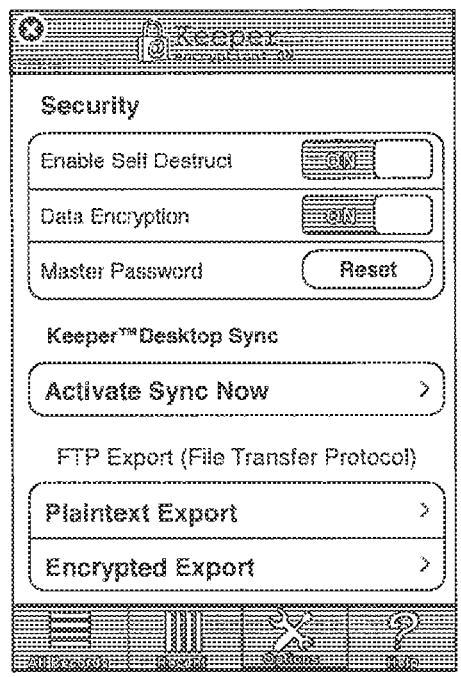
FIG. 13 is a synchronization screen that may be selected through the screens of FIGS. 9-12.

If the user chooses to activate the Save softkey 1104 or Cancel softkey 1106, then the user may be taken back to the title list of screen 900. From the title list of screen 900, the user may activate an Options softkey 906 and be presented with the tools screen 1200 of FIG. 13.

On the tools screen 1200, the user may activate the Enable Self Destruct softkey switch 1202 to enable the automatic deletion of records 24, 26 upon the entry of a sequence of incorrect master password a predetermined number of times. Alternatively, the user may activate a Data Encryption softkey switch 1204 to encrypt the files 24, 26 and master password saved on the mobile device 32. The user may also activate a Master Password Reset softkey 1206 to reset the master password.

The user may also initiate a synchronization procedure through the Activate Sync Now softkey 1208. The user may also specify the format of synchronization by selecting either a Plaintext Export softkey 1210 or a Encrypted Export softkey 1212.

If the user activates the Activate Sync Now softkey 1208, the user may be asked to activate a further softkey switch to confirm his/her desire to synchronize with the laptop 12. If the user confirms, his/her desire to continue, then the mobile device presents an address for use with and entry into the laptop in order to facilitate synchronization. Once complete, the mobile device presents a screen to the user confirming the successful synchronization of the mobile device 32.

In another embodiment of the invention, the password processor 18 may compare any entered password with a booby trap password 46. The use of a booby trap password 46 may be useful in cases where the user of the system is under duress. For example, a user on a public street may be threatened with harm if the user does not provide a thief with the master password. In this case, the booby trap password 46 may be a password that instead of providing access to the files operates to immediately delete the files 20, 26.

As above, the booby trap password 46 may be encrypted using a public key and the booby trap password 46 and saved as an encrypted booby trap file 48. Any entered password may be used to decrypt the file 48. If the entered password successfully decrypts the file 48, the deletion processor 28 may be immediately activated to delete the files 24, 26.

In still another embodiment, the successful decryption of the booby trap file 50 may result in a series of steps intended to confound a threat. In this case, the successful decryption of the booby trap file 48 may cause a set of bogus information from a file 50 to be displayed on the screen including a set of bogus passwords or passwords that if used by the threat would immediately cause an alert to be sent to the authorities.

A specific embodiment of method and apparatus for protecting confidential information has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A computer-implemented method for securing confidential information on a computing device, the device having a display associated therewith, comprising:
   receiving data corresponding to the confidential information;
   creating a plurality of files on the device based on the received data, wherein each of the plurality of files is associated with a respective account, and wherein each of the plurality of files stores a respective account password that is generated during the plurality of files creation and is associated with such account;
   encrypting the plurality of files using an encryption key;
   storing the encrypted plurality of files on the device;
   associating a master password, provided by a user, with the encrypted plurality of files, wherein the master password is different than each of the respective account passwords generated during the creation of the corresponding plurality of files and stored therein;
   receiving a password from the user; and
   comparing the received password and the master password, and, if the received password and master password match:
      decrypting the plurality of files,
      displaying, on the display, file identifiers respectively associated with each of the decrypted plurality of files,
      receiving a selection of one of the displayed file identifiers, wherein a determination that the received selection causes a frequency of selecting the one of the displayed file identifiers at a geographical location to exceed a predetermined selection threshold triggers an association of the geographical location with one of the plurality of files associated with the selected file identifier, and
      displaying the account password stored in the file associated with the account associated with the selected file identifier.

2. The method of claim 1, further comprising sequentially receiving a predetermined number of passwords that do not match the master password and, in response, deleting the plurality of files.

3. The method of claim 1, further comprising receiving a predetermined booby trap password and, in response, deleting the plurality of files.

4. The method of claim 3, further comprising restoring the deleted plurality files from a backup of the plurality of files.

5. The method of claim 3, wherein a successful decryption of the booby trap password may cause a set of bogus information to be displayed including a set of bogus passwords or passwords that if used by a threat causes an alert to be sent to authorities.

6. The method of claim 1, further comprising associating an additional geographical location with the plurality of files automatically once encrypted and stored on the device.

7. The method of claim 1, further comprising receiving a current geographical location associated with the device that matches substantially the geographical location and automatically selecting the file associated with the current geographical location.

8. The method of claim 1, further comprising receiving a current geographical location associated with the device and wherein displaying the file identifiers respectively associated with each of the plurality of files includes displaying the file identifiers in accordance with a sorting order, wherein the sorting order is in accordance with the frequency with which the file identifier has previously been selected at the current geographical location.

9. The method of claim 1, wherein the device is a mobile device and includes a GPS controller that provides geographical location information.

10. A system for securing confidential information on a computing device, the device having a display and a storage medium associated therewith, comprising:
   a plurality of files created based on the confidential information and stored on the device in an encrypted format in the storage medium, wherein each of the plurality of files is associated with a respective account, and wherein each of the plurality of files stores a respective account password that is generated during the plurality of files creation and is associated with such account;
   a master password provided by a user and stored in the storage medium, wherein the master password is associated with the encrypted plurality of files and is different than each of the respective account passwords generated during the creation of the corresponding plurality of files and stored therein;
   a password processor that receives a password from the user and compares the received password and the master password and, if the received password and master password match, the password processor is configured to:
      decrypt the plurality of files,
      display a navigation screen on the display having file identifiers respectively associated with each of the decrypted plurality of files,
      receive a selection of one of the displayed file identifiers, wherein a determination that the selection causes a frequency of selecting the one of the displayed file identifiers at a geographical location to exceed a predetermined threshold triggers an association of the geographical location with one of the plurality of files associated with the selected file identifier, and
      display the account password stored in the file associated with the account associated with the selected file identifier.

11. The system of claim 10, wherein the password processor sequentially receives a predetermined number of passwords that do not match the master password and, in response, deletes the plurality of files.

12. The system of claim 10, wherein the password processor deletes the plurality of files in response to receipt of a booby trap password.

13. The system of claim 12, wherein the deleted plurality of files is restored onto the storage medium from a previously created backup of the plurality of files.

14. The system of claim 12, wherein a successful decryption of the booby trap password may cause a set of bogus information to be displayed including a set of bogus passwords or passwords that if used by a threat causes an alert to be sent to authorities.

15. The system of claim 10, further comprising a position comparison processor that associates an additional geographical location with the plurality of files automatically once encrypted and stored on the device.

16. The system of claim 10, wherein the position comparison processor receives a current geographical location associated with the device that matches substantially the geographical location and automatically selects the file associated with the current geographical location.

17. The system of claim 10, wherein the position comparison processor receives a current geographical location associated with the device and the password processor displays the file identifiers respectively associated with each of the plurality of files in accordance with a sorting order, wherein the sorting order is in accordance with the frequency with which the file identifier has previously been selected at the current geographical location.

18. The system of claim 10, wherein the device is a mobile device and includes a GPS controller that provides geographical location information.

* * * * *